US011829401B2

(12) United States Patent
Deng et al.

(10) Patent No.: US 11,829,401 B2
(45) Date of Patent: Nov. 28, 2023

(54) METHOD FOR TABLE EXTRACTION FROM JOURNAL LITERATURE BASED ON TEXT STATE CHARACTERISTICS

(71) Applicant: Guangxi University, Nanning (CN)

(72) Inventors: Jianxin Deng, Nanning (CN); Rui Tang, Nanning (CN); Zhixing Ye, Nanning (CN); Deqiang He, Nanning (CN); Bin Xie, Nanning (CN); Xiangming Zeng, Nanning (CN); Xianwang Li, Nanning (CN)

(*) Notice: Subject to any disclaimer, the term of this patent is extended or adjusted under 35 U.S.C. 154(b) by 673 days.

(21) Appl. No.: 16/948,706

(22) Filed: Sep. 29, 2020

(65) Prior Publication Data

US 2021/0158034 A1 May 27, 2021

(30) Foreign Application Priority Data

Nov. 27, 2019 (CN) .......................... 201911179649.3

(51) Int. Cl.
  *G06F 16/36* (2019.01)
  *G06F 16/23* (2019.01)
  *G06V 30/412* (2022.01)
  *G06V 30/414* (2022.01)
  *G06V 30/28* (2022.01)

(52) U.S. Cl.
  CPC ........ *G06F 16/367* (2019.01); *G06F 16/2365* (2019.01); *G06V 30/412* (2022.01); *G06V 30/414* (2022.01); *G06V 30/293* (2022.01)

(58) Field of Classification Search
  CPC .. G06V 30/414; G06V 30/412; G06V 30/413; G06V 30/10; G06V 30/416; G06V 10/507; G06V 30/153; G06V 30/293; G06F 40/258; G06F 40/30; G06F 16/93; G06F 16/367; G06F 16/2365
  See application file for complete search history.

(56) References Cited

U.S. PATENT DOCUMENTS

| | | | | |
|---|---|---|---|---|
| 2002/0052893 A1* | 5/2002 | Grobler | ................. | G06F 16/258 715/255 |
| 2010/0174985 A1* | 7/2010 | Levy | .................... | G06F 40/106 715/244 |

(Continued)

FOREIGN PATENT DOCUMENTS

WO    WO-2019075968 A1 *    4/2019    ........... G06F 17/245

*Primary Examiner* — Dung Hong
(74) *Attorney, Agent, or Firm* — Stonebridge IP, PLLC

(57) ABSTRACT

A method for table extraction from journal literature based on text state characteristics is disclosed. The method includes: constructing a table model according to characteristics of tables in journal literature, where the table model includes two parts: a table caption and table content, building a text line set, table detection, table data positioning, table reconstruction, building a cell data set, restoring data of merged cells, checking the cell data set, and outputting table data. The method is particularly designed based on characteristics of tables such as three-line tables widespread in PDF journal literature, which can realize accurate and correct extraction of specific tables in the PDF journal literature, and especially can ensure a logic relationship of a three-line table. The whole process neither requires manual intervention or interaction nor requires table selection, so that the whole extraction process is automatic.

10 Claims, 9 Drawing Sheets

(56) References Cited

U.S. PATENT DOCUMENTS

| | | | |
|---|---|---|---|
| 2014/0369602 A1* | 12/2014 | Meier | G06V 30/412 |
| | | | 382/182 |
| 2018/0189560 A1* | 7/2018 | Chen | G06V 30/416 |
| 2019/0332662 A1* | 10/2019 | Middendorf | G06F 40/216 |
| 2020/0042785 A1* | 2/2020 | Burdick | G06V 30/416 |
| 2021/0004582 A1* | 1/2021 | Evans | G06F 40/216 |

* cited by examiner

| Level-1 concept | Level-2 concept | Level-3 concept |
|---|---|---|
| Squeeze casting | Material composition | Chemical composition |
| | | Mass fraction |
| | Process parameters | Test parameters |
| | | Control parameters |
| | Properties | Mechanical characteristics | as a study object, an impact rule of a casting temperature and a cooling speed on the microscopic structure of the semi-solid squeeze casting AZ80 Mg-alloy is analyzed.

1 Test material and process

1.1 Test materials

The test materials are commercial pure magnesium, pure aluminum, pure zinc, Al-Mg intermediate alloy, and the like. To prevent combustion of the magnesium alloy, 1% of Ca was added to the Mg-alloy, to improve the ignition point of the Mg-alloy and reduce slag inclusion of the alloy due to oxidization. The AZ80 Mg-alloy ingot adopted in the test was in an original state without any treatment. For the chemical composition of the AZ80 Mg-alloy, see Table 1.

Tab. 1 The chemical composition of AZ80 Mg-alloy

| Al | Zn | Mn | Cu | Fe | Ni | Si | Mg |
|---|---|---|---|---|---|---|---|
| 7.9-9.1 | 0.41-0.59 | 0.15-0.50 | <0.03 | <0.01 | <0.004 | <0.01 | Balance |

1.2 semi-solid squeeze casting process

Smelting was performed with a 3kW resistance furnace. The resistance furnace was preheated to 400°C, to add was 1500 kN, and parameters of extrusion forming are shown in Table 2

Tab. 2 The process parameters for squeeze casting

| Squeeze temperature /(mm·s⁻¹) | Squeeze pressure /MPa | Pressure holding time /s | Temperature holding time /s | Mold temperature /°C |
|---|---|---|---|---|
| 20-40 | 80-110 | 5-15 | 15-25 | 150-250 |

2 Impact of casting temperature on structure of AZ80 alloy

The impact rule of temperature variations on the microscopic structure of the semi-solid squeeze casting AZ80 Mg-alloy was analyzed by using different casting temperatures. When the casting temperature was too high, the alloy liquid was oxidized more severely during casting, and oxide inclusion was mixed easily (the black region in FIG. 1(c)), causing a decline in the density of the ingot. The clustering of the impurities increased the possibility of cracking. The excessively high casting temperature further causes burrs, increasing the contraction of the alloy. Defects such as shrinkages, puffs and cracks occurred easily inside the ingot, reducing the properties of the ingot. If the casting temperature was too low, causing skinning of the melt, and affecting the proceeding of the semi-solid squeeze casting process. Therefore (a)

| | A | B | C | D | E | F | G | H |
|---|---|---|---|---|---|---|---|---|
| 1 | Squeeze speed | Squeeze pressure | Pressure maintain time | Temperature maintain time | Mold temperature | | | |
| 2 | /(mm·s⁻¹) | /MPa | /s | /s | /°C | | | |
| 3 | 20-40 | 80-110 | 5-15 | 15-25 | 150-250 | | | |
| 4 | | | | | | | | |
| 5 | Al | Zn | Mn | Cu | Fe | Ni | Si | Mg |
| 6 | 7.9-9.1 | 0.41-0.59 | 0.15-0.50 | <0.03 | <0.01 | <0.004 | <0.01 | Balance |

METHOD FOR TABLE EXTRACTION FROM JOURNAL LITERATURE BASED ON TEXT STATE CHARACTERISTICS

CROSS REFERENCE TO RELATED APPLICATIONS

This application claims priority under 35 USC § 119(a) to Chinese Application No. 201911179649.3 filed on Nov. 27, 2019, which application is herein incorporated by reference in its entirety.

BACKGROUND OF THE DISCLOSURE

Field of the Invention

The present invention relates to the technical field of information extraction from Portable Document Format (PDF) files, and in particular, to a method for table extraction from journal literature based on text state characteristics.

Description of the Related Art

The Portable Document Format (PDF), with a fixed page presentation effect and a powerful capability of reproducing the original across platforms, is an international file format for transmission and storage of journal literature. As one of the major means for spreading scientific knowledge and data, journal literature grows in number year by year. However, a large amount of effective data in the journal literature is not fully used.

Scientific data is an important basic strategic resource for the national scientific and technological innovation as well as socio-economic development. Especially, the scientific research and technological innovation in the era of big data are more dependent on massive, systematic, highly credible scientific data. As a visual knowledge expression model, a table can describe a logic relationship between complex data in a simple and clear way, and is one of the most common methods for constructing and expressing data with a high information density. Data presented in a table form is common in academic literature. Therefore, automatic acquisition of table data (namely, table extraction) from PDF files is an indispensable part of a scientific data extraction task, and is also foundation work for deep mining and analysis of data. To study table extraction in PDF journal literature is of great significance for construction and sharing of scientific databases.

A table in a PDF file is formed by frame lines and specific content that are spliced together through coordinates, and is not stored as an integrated object. Most of current PDF table extraction technologies depend on the recognition of table frame lines, to achieve positioning of table regions and data extraction. However, such technologies cannot authentically restore tables with few frame lines (especially three-line tables), and cannot accurately reconstruct logic structures of the tables. Besides, if cell merging occurs, such technologies cannot desirably achieve the correspondence between data.

Therefore, by particularly studying tables in journal literature, a PDF table extraction method based on text state characteristics is designed, to extract a variety of table layouts in PDF files and restore a row-column logic relationship between cells.

SUMMARY OF THE INVENTION

An objective of the present invention is to provide a method for table extraction from journal literature based on text state characteristics, to solve the technical problem that existing table extraction from a PDF file has a low restoration degree and cannot accurately reconstruct a logic structure of a table.

A method for table extraction from journal literature based on text state characteristics includes the following steps:

step 1: constructing a table model according to characteristics of tables in journal literature, the table model including two parts: a table caption and table content;

step 2: building of a text line set: decoding a stream of PDF page content in units of pages by using a tool, to obtain all parameter information related to text, including a character font, a font size, a character width, a character height, a character spacing, horizontal and vertical coordinates and a scale factor thereof, and defining a text line clustering rule to cluster characters belonging to the same line as a text line;

step 3: table detection: defining a regular expression of table captions, traversing the text line set Line, marking all text lines meeting the regular expression to form candidate title text lines, screening meanings of all the candidate title text lines by using a semantic ontology model, and marking title text lines of which the meanings meet a requirement, to build a title line set Title, where tables irrelevant to the requirement are filtered out by constructing the semantic ontology model for table captions;

step 4: table data positioning: separating the table content from other content according to line spacing variations of the text and variations of character state parameters, determining a border of the table content, and marking table data till the border of the table content or the end of current-page characters; and step 5: table reconstruction: building a cell data set, restoring data of merged cells, checking the cell data set, and outputting the table data.

Further, in step 1, the table caption includes an English title and a Chinese title, the Chinese title is in a format of table+table sequence number+space+table caption, the English title is in a format of Tab(le)+table sequence number+space+table caption, and information of the table content is configured as a two-dimensional array with fully filled rows and columns.

Further, in step 2, the PDF page content includes body text, table content and picture content that are formed by individual characters respectively, the body text includes title content of chapters, all individual characters on the page are clustered according to variations of character coordinates, to build the text line set Line, and text state parameters corresponding to each line of text are stored.

Further, in step 2, the scale factor of the horizontal and vertical coordinates in the parameter information is directly proportional to the font size of the character, that is, a character with a larger font size has a larger scale factor of horizontal and vertical coordinates; two adjacent lines with a larger line spacing correspond to a greater vertical-coordinate difference, and the difference is definitely greater than the character height; horizontal coordinates of characters in the same line sequentially increase from left to right; a vertical-coordinate difference between a superscript and a main character is 3 to 5 units, and a vertical-coordinate difference between a subscript and a main character is 1.5 to 2 units; therefore, a vertical-coordinate difference between characters in the same line is not greater than 6 units.

Further, in step 3, the regular expression is (^Table{0,}[1 −9]+{0,}(·*)) and (^Tab(le)[·]{0,}[1 −9]+{0,}(·*)).

Further, in step 3, the semantic ontology model is constructed by summarizing concepts of keywords related to the table captions and corresponding English expressions according to a table extraction requirement, that is, when journal literature includes tables of various data types, one type of table or several types of tables may be obtained.

Further, a specific process of step 4 includes: marking table data, where table data marking is started by using each text line in the title line set Title as a start point; text state parameters of the title line are obtained first, and then a query is started in a text line next to the title line; if the character font size and the scale factor of the horizontal coordinate of the text line are both less than or equal to the corresponding parameters of the title line and the vertical coordinate of the text line is greater than the vertical coordinate of the table caption line, the text line is marked as a table data line; the next text line is continued to be checked, until the font size parameter and the coordinate parameters of the text line do not meet restrictive conditions, or it is retrieved that the next text line is a marked table caption line, or the end of current-page text lines is reached, and then table data marking is stopped; and screening table data, where the marked table data lines need to be screened because there is table-irrelevant content in the marked table data lines; the marked data lines are queried to check corresponding coordinate parameters; each data line of which the line spacing increases abnormally and the horizontal and vertical coordinates change abruptly is removed, to finally obtain a table data line set denoted by Data.

Further, a specific process of building the cell data set in step 5 includes: splitting text lines, where a lower limit of a spacing between cell data columns is set to be 2.5, horizontal coordinates of adjacent characters are calculated, and the text lines in the table data line set Data are split one by one according to formula (1), to build the cell data set Cell, $$|x_{i+1}-x_i|-\text{width}>2.5 \tag{1}$$

where $x_i$ represents a horizontal coordinate of the $i^{th}$ character in the text line, $x_{i+1}$ represents a horizontal coordinate of the $(i+1)^{th}$ character, and width represents a character width;

calculating horizontal-coordinate differences between last characters of all cells and first characters of next cells of the line according to a splitting result, and taking a minimum difference as a column spacing estimate Col of the cells;

merging wrapped text: calculating vertical-coordinate differences DY of all adjacent lines in the cell data set Cell, to obtain a most frequent vertical-coordinate difference $DY_m$ and vertical-coordinate differences that differ from $DY_m$ by no more than 5, and calculating a mean value of the obtained differences as a basic line spacing DK) of the table; and if there is a vertical-coordinate difference DY less than the line spacing $DY_0$, obtaining horizontal coordinates of the first and last characters of data in two cells of adjacent lines corresponding to DY, and determining whether ranges of the two cells overlap; if yes, merging text in the two cells, and updating the cell data set Cell.

Further, a specific process of restoring data of merged cells and checking the cell data set in step 5 includes: restoring data of merged cells, where for a cell determined as a merged cell, a data structure is restored and the cell data set Cell is updated;

determining whether there is any merged cell column according to formula (2); if yes, restoring two cells with identical data from the merged cell column, where horizontal coordinates of the two cells are equal to those of cells B2 and C2 respectively, B2 and C2 represent cell code numbers, and vertical coordinates of the two cells are equal to that of a merged cell B; and repeating this process to sequentially restore cell data of all the merged columns;

$$|x_{B_{front}}-x_{B2_{front}}|\approx|x_{B_{end}}-x_{C2_{end}}| \tag{2}$$

where $x_{B_{front}}$ represents an X-axis coordinate at the front of the cell B, $x_{B2_{front}}$ represents an X-axis coordinate at the front of the cell B2, $x_{B_{end}}$ represents an X-axis coordinate at the end of the cell B, $x_{C2_{front}}$ represents an X-axis coordinate at the end of the cell C2;

determining whether there is any merged cell row according to formula (3); if yes, restoring two cells with identical data from the merged cell row, where horizontal coordinates of the two cells are equal to that of a merged cell F, vertical coordinates of the two cells are equal to those of the cells E1 and E2 respectively, and E1 and E2 represent cell code numbers; and repeating this process to sequentially restore cell data of all the merged rows;

$$|y_{E2}-y_F|\approx|y_{E1}-(y_F-\text{Height})| \tag{3};$$

where $y_{E2}$ represents a vertical coordinate at the bottom of the cell E2, $y_F$ represents a vertical coordinate at the bottom of the cell F, $y_{E1}$ represents a vertical coordinate at the bottom of the cell E1, and Height represents a height of the cells E1 and E2; and checking the cell data set: obtaining the number of rows Row of cell data rows, obtaining the number of cell data columns of each row, taking a maximum column number $\text{Col}_{max}$, and finally outputting an array of $\text{Row}\times\text{Col}_{max}$; sequentially determining whether the number of cell columns in each row is equal to $\text{Col}_{max}$, and if not, searching for a data missing position of the row; sequentially comparing horizontal coordinates of this row of cell data with a row of which the number of columns is equal to $\text{Col}_{max}$, to obtain a position without a shared horizontal coordinate range, and filling the position with null.

Further, a specific process of outputting table data in step 5 includes: sequentially storing the cell data into the array according to an ascending order of horizontal coordinates and an ascending order of vertical coordinates:

$$C_{mn}=\begin{pmatrix} c_{11} & \cdots & c_{1n_1} \\ \vdots & \ddots & \vdots \\ c_{m1} & \cdots & c_{mn_n} \end{pmatrix}$$

where $c_{mn_n}$ represents obtained data, and in this way, a table extraction result of this page can be obtained.

By using the foregoing technical solution, the present invention achieves the following technical effects:

The method of the present invention is particularly designed based on characteristics of tables such as three-line tables widespread in PDF journal literature, which can realize accurate and correct extraction of specific tables in the PDF journal literature, and especially can ensure a logic relationship of a three-line table. The whole process neither requires manual intervention or interaction nor requires table selection, so that the whole extraction process is automatic. Because an ontology is used to assist in table filtering, this method is also widely applicable. By setting and changing ontologies in different fields, the method can be used for extracting tables of a specified class in PDF files of different fields, thus solving the technical problem that the existing table extraction from a PDF file has a low restoration degree and cannot accurately reconstruct a logic structure of a table.

BRIEF DESCRIPTION OF THE DRAWINGS

FIG. 9 is a diagram of example verification according to the present invention.

DETAILED DESCRIPTION

In order to make the objectives, technical solutions, and advantages of the present invention clearer and more comprehensible, the present invention is described in further detail with reference to referred embodiments. However, it should be noted that many details listed in the specification are merely used to help a reader to understand one or more aspects of the present invention thoroughly, and the aspects of the present invention can also be implemented without these specific details.

Figure 1:
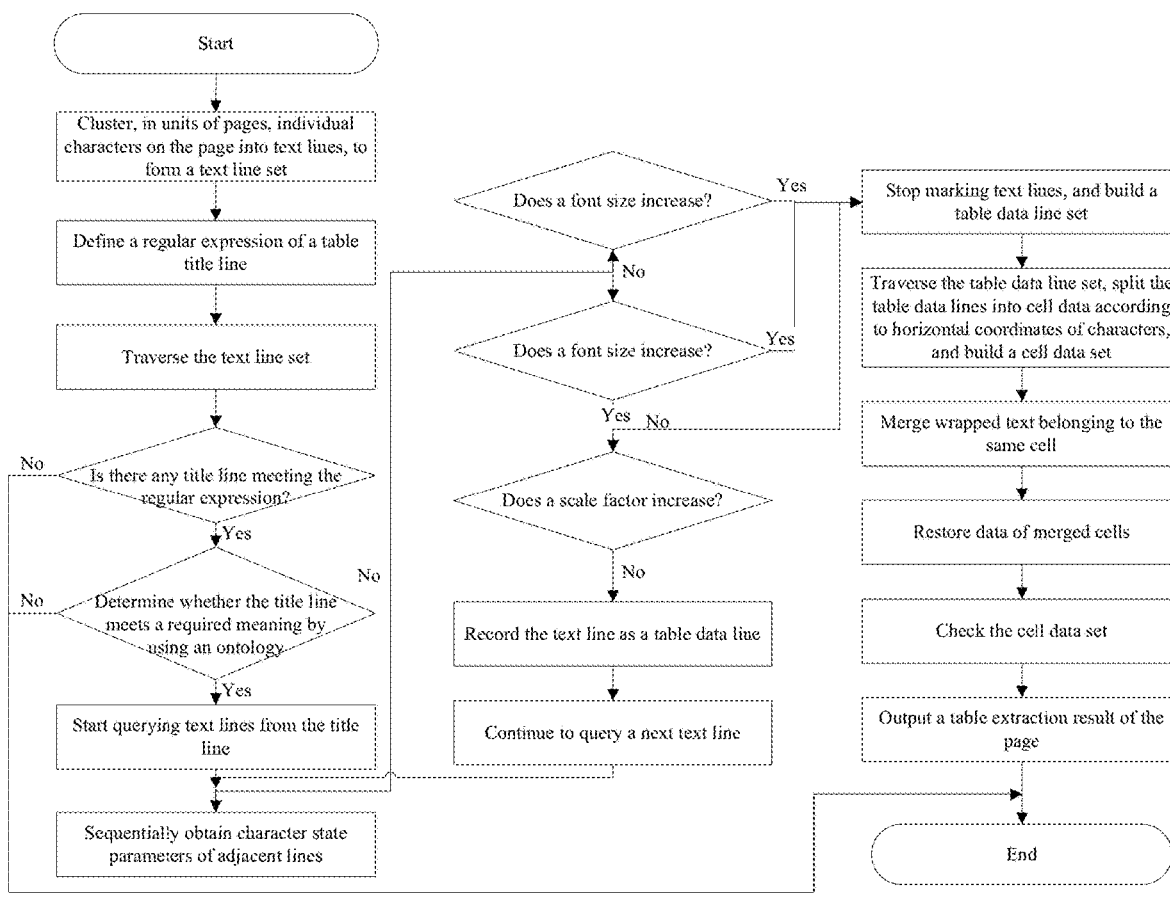
FIG. 1 is a flowchart of a method according to the present invention.
Figure 2:
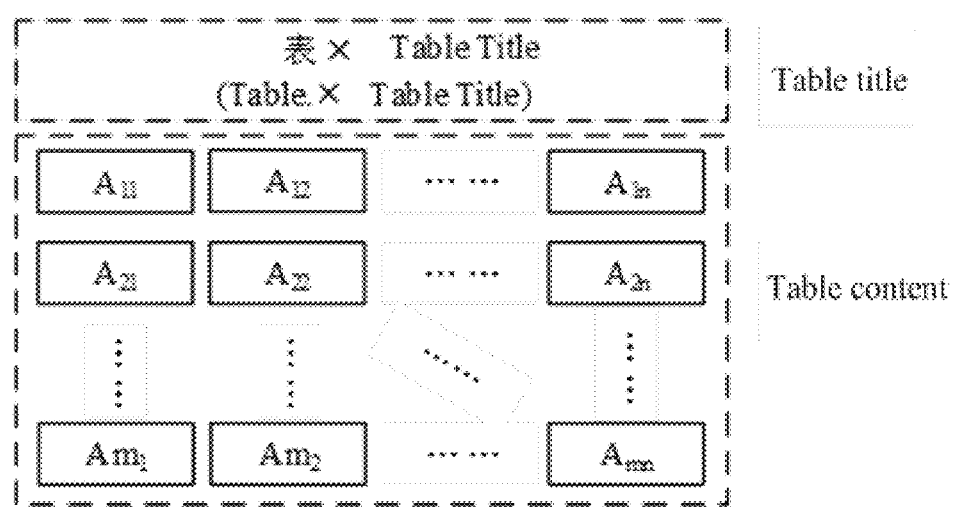
FIG. 2 is a schematic diagram of a table information expression model according to the present invention.

As shown in FIG. 1, a method for table extraction from journal literature based on text state characteristics includes the following steps:

Step 1: this method abstracts tables in journal literature into the following model according to characteristics of the tables in journal literature, and the present invention is established on this basis. The abstract table model of the journal literature includes two main parts: a table caption and table content. A Chinese title of a table satisfies a format of "table+table sequence number+space+table caption", and an English title satisfies a format of "Tab(le)+table sequence number+space+table caption". Regardless of changes in structures of cells, table content information is considered as a two-dimensional array with fully filled rows and columns, as shown in FIG. 2.

A PDF table extraction method based on the foregoing model includes four steps: building of text lines, table detection, table data positioning, and table structure restoration.

Step 2: build a text line set.

A stream of PDF content is decoded in units of pages by using a tool such as PDFBox, to obtain all parameter information related to text, including a character font (Font), a font size (FontSize), a character width (Width), a character height (Height), a character spacing (WidthOfSpacing), horizontal and vertical coordinates (X, Y) and a scale factor (XScale) thereof, and the like. A text order obtained by decoding PDF content in order is a normal reading order. Text state parameters have the following variation rule:

the scale factor of the horizontal and vertical coordinates is directly proportional to the font size of the character, that is, a character with a larger font size has a larger a scale factor of horizontal and vertical coordinates;

two adjacent lines with a larger line spacing corresponds to a greater vertical-coordinate difference, and the difference is definitely greater than the character height; and horizontal coordinates of characters in the same line increases from left to right; a vertical-coordinate difference between a superscript and a main character is 3 to 5 units, and a vertical-coordinate difference between a subscript and a main character is 1.5 to 2 units; therefore, a vertical-coordinate difference between characters in the same line is not greater than 6 units.

Figure 3:
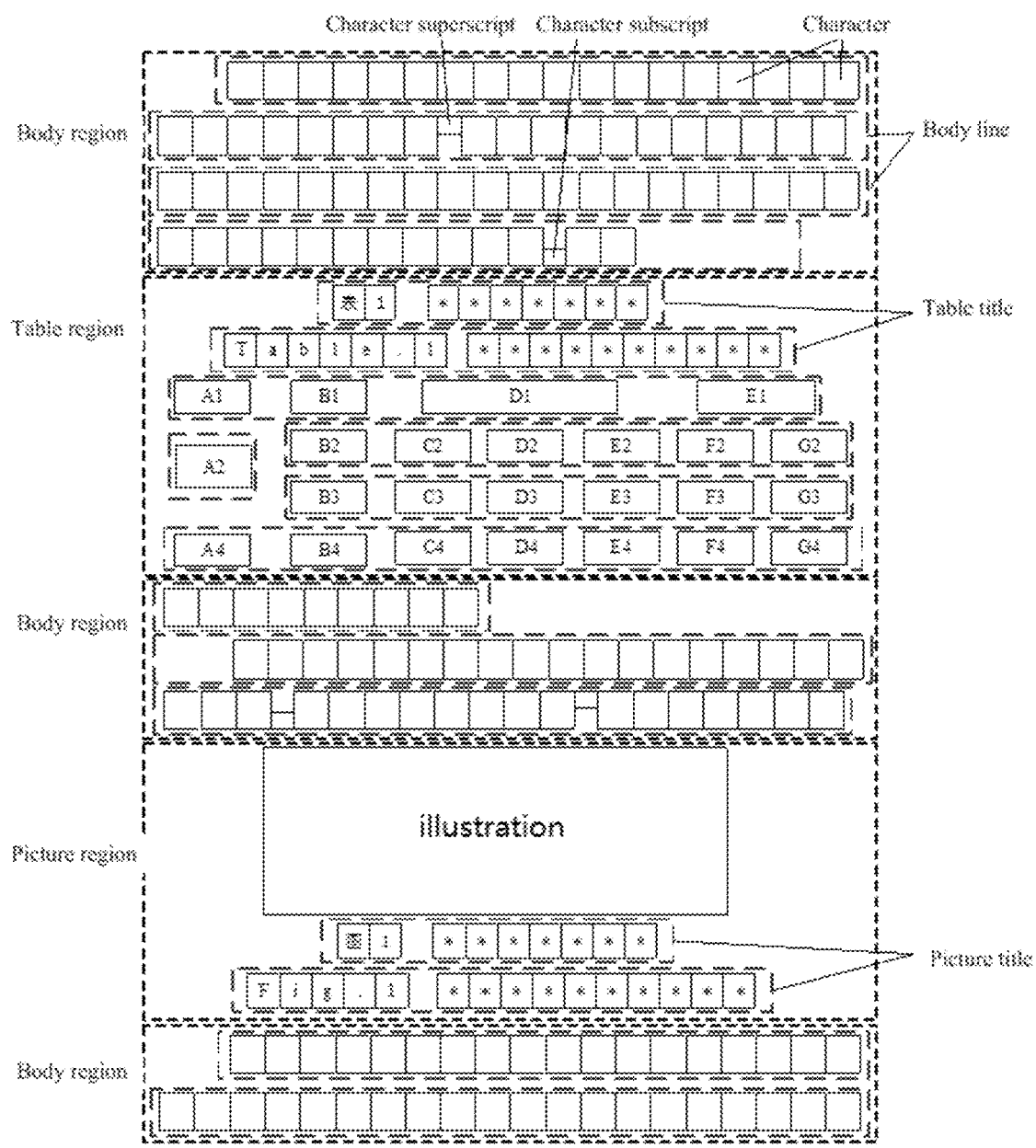
FIG. 3 is a diagram of building a text line set of a page according to the present invention.

As shown in FIG. 3, the page content mainly includes body text, table content and picture content that are formed by individual characters respectively. All individual characters on the page are clustered according to variations of character coordinates, to build a text line set Line, and text state parameters corresponding to each line of text are stored.

Step 3: table detection.

Regular expressions of the table caption are defined as "(^Table{0,}[1 −9]+{0,}(·*))" and "(^Tab(le)[·]{0,}[1 −9]+{0,}(·*))".

The text line set Line is traversed, and all text lines meeting the regular expressions are marked to form candidate title text lines. Meanings of all the candidate title text lines are screened by using a semantic ontology model, and title text lines of which the meanings meet a requirement are marked, to establish a title line set Title.

Figure 4:
FIG. 4 is a diagram of constructing a semantic ontology model according to an embodiment of the present invention.

The semantic ontology model is constructed by summarizing concepts of main keywords related to the table captions and corresponding English expressions according to a table extraction requirement (generally, journal literature includes tables with various types of data, and only a certain type of table may be obtained). For example, if process parameters of squeeze casting are to be obtained, it is determined that a research boundary is the squeeze casting field, and related keywords are process parameter, material composition, and properties. Possible synonymous keywords as well as their levels and constraint relations are defined, as shown in FIG. 4.

Tables irrelevant to the requirement is filtered out by constructing the semantic ontology model for table captions. For example, if it only needs to obtain tables of process parameters of squeeze casting, and the focus is only on table data related to the process parameters in the literature, only a concept ontology related to the process parameters of the squeeze casting needs to be constructed.

Step 4: table data positioning.

The table content is separated from other content according to line spacing variations of the text and variations of character state parameters, and a border of the table content is determined. Table data is marked till the border of the table content or the end of current-page characters.

1) Marking Table Data

Table data marking is started by using each text line in the title line set Title as a start point. Text state parameters of the title line are obtained first, and then a query is started in a text line next to the title line; if the character font size and the scale factor of the horizontal coordinate of the text line are both less than or equal to the corresponding parameters of the title line and the vertical coordinate of the text line is greater than the vertical coordinate of the table caption line, the text line is marked as a table data line; the next text line is continued to be checked, until the font size parameter and the coordinate parameters of the text line do not meet restrictive conditions, or it is retrieved that the next text line is a marked table caption line, or the end of current-page text lines is reached, and then table data marking is stopped.

2) Table Data Screening

There may be table-irrelevant content in the marked table data lines, for example, header and footer text, and figure notes. Therefore, the marked table data lines need to be screened.

As shown in FIG. 3, regardless of changes in the table structure, the table content has a border, and for coordinates of data lines belonging to the same table, their horizontal and vertical coordinate values definitely fall within a certain range. Therefore, the marked data lines are queried to check corresponding coordinate parameters; each data line of which the line spacing increases abnormally and the horizontal and vertical coordinates change abruptly is removed, to finally obtain a table data line set denoted by Data.

Step 5: table reconstruction.

1) Establish a Cell Data Set.

(1) Split Text Lines.

A lower limit of a spacing between cell data columns is set to be 2.5, horizontal coordinates of adjacent characters are calculated, and the text lines in the table data line set Data are split one by one according to formula (1), to build a cell data set Cell.

$$|x_{i+1}-x_i|-\text{width} > 2.5 \qquad (1)$$

where $x_i$ represents a horizontal coordinate of the $i^{th}$ character in the text line, $x_{i+1}$ represents a horizontal coordinate of the $(i+1)^{th}$ character, and width represents a character width.

Figure 5:
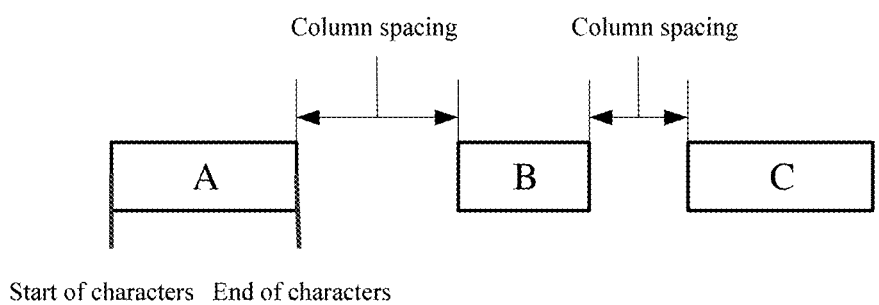
FIG. 5 is a diagram of a column spacing of cells according to the present invention.

Horizontal-coordinate differences between last characters of all cells and first characters of next cells of the line are calculated according to a splitting result, and a minimum difference is taken as a column spacing estimate Col of the cells, as shown in FIG. 5.

(2) Merge Wrapped Text.

Figure 6:
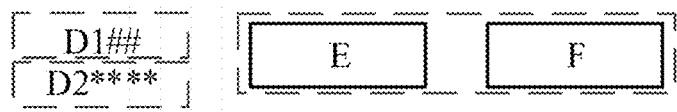
FIG. 6 is a schematic diagram of wrapped text according to the present invention.

Data in different lines may belong to the same cell, that is, wrapped text in the same cell, as shown in FIG. 6.

Vertical-coordinate differences DY of all adjacent lines in the cell data set Cell are calculated, to obtain a most frequent vertical-coordinate difference $DY_m$ and vertical-coordinate differences that differ from $DY_m$ by no more than 5, and a mean value of the obtained differences is calculated and used as a basic line spacing DK) of the table.

If there is a vertical-coordinate difference DY less than the line spacing $DY_0$, horizontal coordinates of the first and last characters of data in two cells of adjacent lines corresponding to DY are obtained, and it is determined whether ranges of the two cells overlap. If yes, text in the two cells is merged, and the cell data set Cell is updated.

2) Restore Data of Merged Cells.

The cell data set Cell obtained at this point does not have the original structure of the table, and cannot express a logic relationship between data, especially in the case where several rows or columns are merged. For a cell determined as a merged cell, a data structure is restored, and the cell data set Cell is updated.

Figure 7:
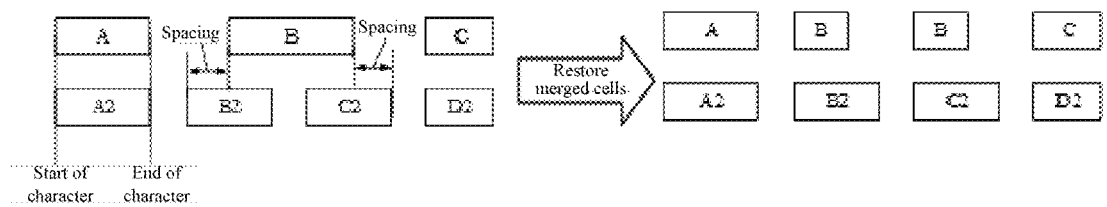
FIG. 7 is a diagram of column merging according to the present invention.

Using FIG. 7 as an example, whether there is any merged cell column is determined according to formula (2). If yes, two cells with identical data are restored from the merged cell column, where horizontal coordinates of the two cells are equal to those of cells B2 and C2 respectively, B2 and C2 represent cell code numbers in FIG. 7, and vertical coordinates of the two cells are equal to that of a merged cell B. This process is repeated to sequentially restore cell data of all the merged columns.

$$|x_{B_{front}} - x_{B2_{front}}| \approx |x_{B_{end}} - x_{C2_{end}}| \qquad (2)$$

Figure 8:
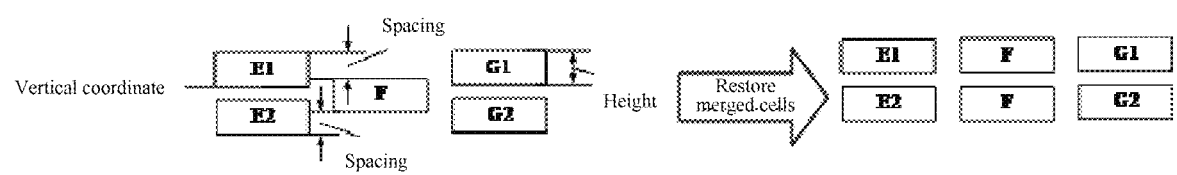
FIG. 8 is a diagram of row merging according to the present invention.

Using FIG. 8 as an example, whether there is any merged cell row is determined according to formula (3). If yes, two cells with identical data are restored from the merged cell row, where horizontal coordinates of the two cells are equal to that of a merged cell F, vertical coordinates of the two cells are equal to those of cells E1 and E2 respectively, and E1 and E2 represent cell code numbers in FIG. 8. This process is repeated to sequentially restore cell data of all the merged rows.

$$|y_{E2} - y_F| \approx |y_{E1} - (y_F - \text{Height})| \qquad (3);$$

3) Check the Cell Data Set.

The number of rows Row of cell data rows is obtained, the number of cell data columns of each row is obtained, and a maximum column number $\text{Col}_{max}$ is taken. Finally, an array of Row×$\text{Col}_{max}$ is outputted. It is sequentially determined whether the number of cell columns in each row is equal to $\text{Col}_{max}$, and if not, a data missing position of the row is searched for. Horizontal coordinates of this row of cell data is sequentially compared with a row of which the number of columns is equal to $\text{Col}_{max}$, to obtain a position without a shared horizontal coordinate range, and the position is filled with null.

4) Output Table Data.

Finally, the cell data is sequentially stored into the array according to an ascending order of horizontal coordinates and an ascending order of vertical coordinates.

$$C_{mn} = \begin{pmatrix} c_{11} & \cdots & c_{1n_1} \\ \vdots & \ddots & \vdots \\ c_{m1} & \cdots & c_{mn_n} \end{pmatrix}$$

In this way, a table extraction result of this page is obtained. Example verification is shown in FIG. 9, where (a) represents an input text fragment, and (b) is an output result.

The method is particularly designed based on characteristics of tables such as three-line tables widespread in PDF journal literature.

The method can realize accurate and correct extraction of specific tables in the PDF journal literature, and especially can ensure a logic relationship of a three-line table. The whole process neither requires manual intervention or interaction nor requires table selection, so that the whole extraction process is automatic. Because an ontology is used to assist in table filtering, this method is also widely applicable. By setting and changing ontologies in different fields, the method can be used for extracting tables of a specified class in PDF files of different fields.

The foregoing descriptions are only preferred implementations of the present invention. It should be noted that for a person of ordinary skill in the art, several improvements and modifications may further be made without departing from the principle of the present invention. These improvements and modifications should also be deemed as falling within the protection scope of the present invention.

What is claimed is:

1. A method for table extraction from journal literature based on text state characteristics, comprising the following steps:

constructing a table model according to characteristics of tables in journal literature, the table model comprising two parts: a table caption and table content;

decoding a stream of Portable Document Format (PDF) page content in units of pages by using a tool, to obtain all parameter information related to text, comprising a character font, a font size, a character width, a character height, a character spacing, horizontal and vertical coordinates and a scale factor thereof, and defining a text line clustering rule to cluster characters belonging to the same line as a text line;

defining a regular expression of table captions, traversing the text line set Line, marking all text lines meeting the regular expression to form candidate title text lines, screening meanings of all the candidate title text lines by using a semantic ontology model, and marking title text lines of which the meanings meet a requirement, to build a title line set Title, wherein tables irrelevant to the requirement are filtered out by constructing the semantic ontology model for table captions;

separating the table content from other content according to line spacing variations of the text and variations of character state parameters, determining a border of the table content, and marking table data to the border of the table content or the end of current-page characters; and building a cell data set, restoring data of merged cells, checking the cell data set, and outputting the table data.

2. The method for table extraction from journal literature based on text state characteristics according to claim 1, wherein the table caption comprises an English title and a Chinese title, the Chinese title is in a format of table+table sequence number+space+table caption, the English title is in a format of Tab(le)+table sequence number+space+table caption, and information of the table content is configured as a two-dimensional array with fully filled rows and columns.

3. The method for table extraction from journal literature based on text state characteristics according to claim 1, wherein the PDF page content comprises body text, table content and picture content that are formed by individual characters respectively, all individual characters on the page are clustered according to variations of character coordinates, to build the text line set Line, and text state parameters corresponding to each line of text are stored.

4. The method for table extraction from journal literature based on text state characteristics according to claim 1, wherein the scale factor of the horizontal and vertical coordinates in the parameter information is directly proportional to the font size of the character, that is, a character with a larger font size has a larger scale factor of horizontal and vertical coordinates; two adjacent lines with a larger line spacing correspond to a greater vertical-coordinate difference, and the difference is definitely greater than the character height; horizontal coordinates of characters in the same line sequentially increase from left to right; a vertical-coordinate difference between a superscript and a main character is 3 to 5 units, and a vertical-coordinate difference between a subscript and a main character is 1.5 to 2 units; and a vertical-coordinate difference between characters in the same line is not greater than 6 units.

5. The method for table extraction from journal literature based on text state characteristics according to claim 1, wherein the regular expression is (^Table{0,}[1 −9]+{0,}(·*)) and (^Tab(le)[·]{0,}[1 −9]+{0,}(·*)).

6. The method for table extraction from journal literature based on text state characteristics according to claim 5, wherein the semantic ontology model is constructed by summarizing concepts of keywords related to the table captions and corresponding English expressions according to a table extraction requirement, when journal literature comprises tables of various data types, one type of table or several types of tables are obtained.

7. The method for table extraction from journal literature based on text state characteristics according to claim 1, further comprising: marking table data, wherein table data marking is started by using each text line in the title line set Title as a start point; text state parameters of the title line is obtained first, and then a query is started in a text line next to the title line; if the character font size and the scale factor of the horizontal coordinate of the text line are both less than or equal to the corresponding parameters of the title line and the vertical coordinate of the text line is greater than the vertical coordinate of the table caption line, the text line is marked as a table data line; the next text line is continued to be checked, until the font size parameter and the coordinate parameters of the text line do not meet restrictive conditions, or it is retrieved that the next text line is a marked table caption line, or the end of current-page text lines is reached, and then table data marking is stopped; and screening table data, wherein the marked table data lines need to be screened because there is table-irrelevant content in the marked table data lines; the marked data lines are queried to check corresponding coordinate parameters; each data line of which the line spacing increases abnormally and the horizontal and vertical coordinates change abruptly is removed, to finally obtain a table data line set denoted by Data.

8. The method for table extraction from journal literature based on text state characteristics according to claim 7, wherein a process of building the cell data set comprises: splitting text lines, wherein a lower limit of a spacing between cell data columns is set to be 2.5, horizontal coordinates of adjacent characters are calculated, and the text lines in the table data line set Data are split one by one according to formula (1), to build the cell data set Cell, $$|x_{i+1}-x_i|-\text{width}>2.5 \qquad (1)$$

wherein $x_i$ represents a horizontal coordinate of the $i^{th}$ character in the text line, $x_{i+1}$ represents a horizontal coordinate of the $(i+1)^{th}$ character, and width represents a character width;

calculating horizontal-coordinate differences between last characters of all cells and first characters of next cells of the line according to a splitting result, and taking a minimum difference as a column spacing estimate Col of the cells;

merging wrapped text: calculating vertical-coordinate differences DY of all adjacent lines in the cell data set Cell, to obtain a most frequent vertical-coordinate difference $DY_m$ and vertical-coordinate differences that differ from $DY_m$ by no more than 5, and calculating a mean value of the obtained differences as a basic line spacing $DY_0$ of the table; and if there is a vertical-coordinate difference DY less than the line spacing $DY_0$, obtaining horizontal coordinates of the first and last characters of data in two cells of adjacent lines corresponding to DY, and determining whether ranges of the two cells overlap; if yes, merging text in the two cells, and updating the cell data set Cell.

9. The method for table extraction from journal literature based on text state characteristics according to claim 1, wherein a process of restoring data of merged cells and checking the cell data set comprises: restoring data of merged cells, wherein for a cell determined as a merged cell, a data structure is restored and the cell data set Cell is updated;

determining whether there is any merged cell column according to formula (2); if yes, restoring two cells with identical data from the merged cell column, wherein horizontal coordinates of the two cells are equal to those of B2 and C2 respectively, and vertical coordinates of the two cells are equal to that of a merged cell B; and repeating this process to sequentially restore cell data of all the merged columns;

$$|x_{B_{front}} - x_{B2_{front}}| \approx |x_{B_{end}} - x_{C2_{end}}| \quad (2)$$

determining whether there is any merged cell row according to formula (3); if yes, restoring two cells with identical data from the merged cell row, wherein horizontal coordinates of the two cells are equal to that of a merged cell F, and vertical coordinates of the two cells are equal to those of E1 and E2 respectively; and repeating this process to sequentially restore cell data of all the merged rows;

$$|y_{E2} - y_F| \approx |y_{E1} - (y_F - \text{Height})| \quad (3);$$

checking the cell data set: obtaining the number of rows Row of cell data rows, obtaining the number of cell data columns of each row, taking a maximum column number $\text{Col}_{max}$, and finally outputting an array of Row×$\text{Col}_{max}$; sequentially determining whether the number of cell columns in each row is equal to $\text{Col}_{max}$, and if not, searching for a data missing position of the row; sequentially comparing horizontal coordinates of this row of cell data with a row of which the number of columns is equal to $\text{Col}_{max}$, to obtain a position without a shared horizontal coordinate range, and filling the position with null.

10. The method for table extraction from journal literature based on text state characteristics according to claim 1, wherein a process of outputting table data comprises: sequentially storing the cell data into the array according to an ascending order of horizontal coordinates and an ascending order of vertical coordinates:

$$C_{mn} = \begin{pmatrix} c_{11} & \cdots & c_{1n_1} \\ \vdots & \ddots & \vdots \\ c_{m1} & \cdots & c_{mn_n} \end{pmatrix}$$

wherein $c_{mn_n}$ represents obtained data, and in this way, a table extraction result of this page is obtained.

* * * * *